(12) United States Patent
Bernsen

(10) Patent No.: US 11,765,172 B2
(45) Date of Patent: *Sep. 19, 2023

(54) NETWORK SYSTEM FOR SECURE COMMUNICATION

(71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,773

(22) Filed: Jun. 27, 2022

(65) Prior Publication Data

US 2022/0329598 A1 Oct. 13, 2022

Related U.S. Application Data

(63) Continuation of application No. 17/096,052, filed on Nov. 12, 2020, now Pat. No. 11,399,027, which is a
(Continued)

(30) Foreign Application Priority Data

Dec. 21, 2015 (EP) ..................... 15201664

(51) Int. Cl.
*H04L 9/40* (2022.01)
*H04W 12/06* (2021.01)
(Continued)

(52) U.S. Cl.
CPC ............ *H04L 63/10* (2013.01); *H04L 9/0819* (2013.01); *H04L 9/32* (2013.01); *H04L 9/3236* (2013.01);
(Continued)

(58) Field of Classification Search
CPC ....... H04L 63/08; H04L 63/10; H04L 9/0819; H04L 9/32; H04L 9/3236; H04W 12/04; H04W 12/06; H04W 12/08; H04W 12/50
(Continued)

(56) References Cited

U.S. PATENT DOCUMENTS

| 8,107,630 B2 * | 1/2012 | Oh ........................ H04L 9/0844 380/278 |
| 2005/0260996 A1 * | 11/2005 | Groenendaal ......... H04W 12/64 455/445 |

(Continued)

FOREIGN PATENT DOCUMENTS

| JP | 2012134744 A | 7/2012 |
| WO | 2010023506 A1 | 3/2010 |
| WO | 2012176076 | 12/2012 |

OTHER PUBLICATIONS

Wi-Fi Simple Configuration Technical Specification, Version 2.0.5. "Connecton Handover" method in section 10.1.3 Wi-Fi Alliance Aug. 4, 2014.
(Continued)

*Primary Examiner* — Dant B Shaifer Harriman

(57) ABSTRACT

In a network system for wireless communication an enrollee accesses the network via a configurator. The enrollee acquires a data pattern that represents a network public key via an out-of-band channel by a sensor. The enrollee derives a first shared key based on the network public key and the first enrollee private key, and encodes a second enrollee public key using the first shared key, and generates a network access request. The configurator also derives the
(Continued)

first shared key, and verifies whether the encoded second enrollee public key was encoded by the first shared key, and, if so, generates security data and cryptographically protects data using a second shared key, and generates a network access message. The enrollee processor also derives the second shared key and verifies whether the data was cryptographically protected and, if so, engages the secure communication based on the second enrollee private key and the security data.

18 Claims, 9 Drawing Sheets

Related U.S. Application Data continuation of application No. 16/062,192, filed as application No. PCT/EP2016/080161 on Dec. 8, 2016, now Pat. No. 10,887,310.

(51) Int. Cl.
| | |
|---|---|
| *H04L 9/32* | (2006.01) |
| *H04W 12/50* | (2021.01) |
| *H04W 12/04* | (2021.01) |
| *H04L 9/08* | (2006.01) |
| *H04W 12/08* | (2021.01) |
| *H04W 4/80* | (2018.01) |
| *H04W 84/12* | (2009.01) |
| *H04W 12/77* | (2021.01) |

(52) U.S. Cl.
CPC .............. *H04L 63/08* (2013.01); *H04W 12/04* (2013.01); *H04W 12/06* (2013.01); *H04W 12/08* (2013.01); *H04W 12/50* (2021.01); *H04L 63/0823* (2013.01); *H04W 4/80* (2018.02); *H04W 12/77* (2021.01); *H04W 84/12* (2013.01)

(58) Field of Classification Search
USPC ............................................................ 726/3
See application file for complete search history.

(56) References Cited

U.S. PATENT DOCUMENTS

| | | | |
|---|---|---|---|
| 2006/0053276 A1* | 3/2006 | Lortz ................... | H04L 63/105 713/2 |
| 2009/0005005 A1* | 1/2009 | Forstall ................. | H04W 88/08 455/411 |
| 2009/0077636 A1* | 3/2009 | Duffie, III .............. | H04L 63/08 726/5 |
| 2011/0211219 A1* | 9/2011 | Bradley .................... | G06F 3/12 358/1.15 |
| 2013/0223279 A1* | 8/2013 | Tinnakornsrisuphap .................... | H04L 41/0809 370/254 |
| 2013/0276063 A1* | 10/2013 | Hahm .................... | H04W 12/04 726/3 |
| 2015/0271667 A1* | 9/2015 | Bernsen .............. | H04L 63/1466 713/171 |
| 2017/0005990 A1* | 1/2017 | Birger ................... | H04L 9/0819 |
| 2017/0289943 A1* | 10/2017 | Zhao ..................... | H04W 12/35 |
| 2018/0109381 A1* | 4/2018 | Cammarota .......... | H04L 9/0819 |
| 2018/0109418 A1* | 4/2018 | Cammarota .......... | H04W 12/50 |
| 2018/0191501 A1* | 7/2018 | Lindemann ........... | H04L 9/0833 |
| 2018/0248694 A1* | 8/2018 | Benoit ................ | H04L 63/0823 |
| 2018/0375870 A1* | 12/2018 | Bernsen ................... | H04L 9/32 |
| 2019/0332774 A1* | 10/2019 | Nix ........................ | H04W 12/50 |
| 2019/0356482 A1* | 11/2019 | Nix ..................... | H04L 63/0823 |
| 2020/0226258 A1* | 7/2020 | Nix .......................... | H04W 4/60 |
| 2022/0294623 A1* | 9/2022 | Yu ............................. | H04L 9/14 |

OTHER PUBLICATIONS

RFC 5297, Synthetic Initialization Vector (SIV) Authenticated Encryption Using the Advanced Encryption Standard (AES) 2015.
DTLS-HIMMO: Efficiently Securing a PQ world with a fully collusion resistant KPS, Oscar Garcia-Morchon, Ronald Rietman, Sahll Sharma, Ludo Tolhuizen, Jose Luis Torre-Arce; http://csrc.nist.gov/groups/ST/post-quantum-2015/presentations/session7-garcia-morchon.pdf; Apr. 3, 2015.
IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY Specifications," (IEEE Std. 801.Nov. 2012), Mar. 2012.

* cited by examiner

NETWORK SYSTEM FOR SECURE COMMUNICATION

CROSS-REFERENCE TO PRIOR APPLICATIONS

This application a continuation of U.S. application Ser. No. 17/096,052 filed Nov. 12, 2020 which is a continuation of U.S. application 16,062,192 filed Jun. 14, 2018 which claims the benefit of International Application No. PCT/EP2016/080161 filed on Dec. 8, 2016, which claims the benefit of European Patent Application No. 15201664.8 filed Dec. 21, 2015. These applications are hereby incorporated by reference herein.

FIELD OF THE INVENTION

The invention relates to a network system for wireless communication between network devices in an area, the network system being arranged for secure communication according to a security protocol.

The present invention relates generally to the field wireless networking (e.g. Wi-Fi), in particular to configuring wireless networks in a secure manner.

BACKGROUND OF THE INVENTION

Over the last decades wireless networks have been provided in many locations. Providing a degree of security for using, accessing or data traffic on the network is a common requirement. A new device that wants to use the network, i.e. a device seeking to join a wireless network, is usually called an enrollee. The enrollee needs to have some credentials, whereas the network hast to keep track of the network access. Such function may be performed by a so called registrar or configurator, i.e. a device with the authority to issue and revoke access to a network, which may be integrated into a wireless access point (AP), or provided as a separate device. The access point may function as a proxy between a registrar and an enrollee.

However, if such credentials are exchanged via wireless communication, third parties also receiving messages may access the credentials and may be able to manipulate the access rights, and/or get unwanted access to private information of the enrollee and further data that is exchanged between the network and the enrollee. For example, public places like restaurants and cafes may operate such networks.

For getting secure access to such rather open networks various options have been proposed for exchanging identity and/or credentials for getting access to the network. Such credentials may, for example, comprise a passphrase that is selected for the network and is generally kept secret but revealed to the user of the enrollee so as to be entered to the enrollee. Such a passphrase may be used to generate a shared key between the enrollee and the network. More advanced security systems may use a well-known system of paired sets of key data commonly called a public key and a private key, such as the RSA public-key system. The RSA public-key system is widely used for secure data transmission. In such a cryptosystem, the encryption key is public and differs from the decryption key which is kept secret. In RSA, this asymmetry is based on the practical difficulty of factoring the product of two large prime numbers, the factoring problem. RSA is made of the initial letters of the surnames of Ron Rivest, Adi Shamir, and Leonard Adleman, who first publicly described the algorithm in 1977. A user of RSA creates and then publishes a public key based on two large prime numbers, along with an auxiliary value. The prime numbers must be kept secret. Anyone can use the public key to encrypt a message, but with currently published methods, if the public key is large enough, only someone with knowledge of the prime numbers can feasibly decode the message. Hence the public key may be revealed to anyone wanting secure communication with a secured device, while the corresponding private key is only known to the secured device. Diffie-Hellman key exchange (DH) can also be based on public/private Elliptic Curve Cryptography (ECC) key pairs are on several key pairs. The shared secret can be computed as $(PubKey_1 + PubKey_2 + \ldots + PubKey_N)^* (PrivKey_{N+1} + \ldots + PrivKey_{N+M})$, which equals $(PubKey_{N+1} + PubKey_{N+2} + \ldots + PubKey_{N+M})^* (PrivKey_1 + \ldots + PrivKey_N)$, where the additions and multiplications are not the usual algebraic additions and multiplications, but are performed on points on an elliptic curve and where one device keeps $\{PrivKey_1, \ldots, PrivKey_N\}$ secret, but makes the corresponding public keys $\{PubKey_1, \ldots, PubKey_N\}$ available to other devices and knows $\{PubKey_{N+1}, PubKey_{N+2}, \ldots, PubKey_{N+M}\}$, so it can derive a shared secret, and the other way around. Examples below use N=1 and M=2.

Further security may be achieved based on generating so called shared key material at both the enrollee and the configurator using both public and private keys at both sides. Such a shared key is generated at the enrollee based on the public network key and the private enrollee key, whereas the same key (hence called shared key) can be generated at the configurator side based on the private network key and the public enrollee key. Various cryptographic methods are known for generating such shared keys, e.g. the Diffie-Hellman key exchange (DH). DH is a specific method of securely exchanging cryptographic keys over a public channel and one of the earliest practical examples of public key exchange implemented within the field of cryptography. Traditionally, secure encrypted communication between two parties required that they first exchange keys by some secure physical channel, such as paper key lists transported by a trusted courier. The Diffie-Hellman key exchange method allows two parties that have no prior knowledge of each other to jointly establish a shared secret key over an insecure channel. This key can then be used to encrypt subsequent communications using a symmetric key cipher.

The Diffie-Hellman key exchange method is such that nobody listening to the protocol exchange can compute the Diffie-Hellman key. However, either party must make certain that the public key that they have received from the other party is indeed from the right party. A malicious third party, usually called a man-in-the-middle, may give his public key to two parties instead of the intended respective public keys, and so set up a Diffie-Hellman key with each of these two, while these two parties are thinking that they communicate directly. So in this case, the man-in-the-middle can decrypt the communication from one party, use it at will, encrypt it with the DH key for the other part and send it to the other party, without the two parties being aware. If at least one of the two parties transfers his public key, using an Out Of Band (OOB) channel that they trust as explained below, to the other one or if the two parties exchange their public keys using a trusted OOB channel, then they can make sure that there is no man-in-the-middle present, by refusing to perform the DH protocol with a party whose public key that have not received OOB. Instead of transferring the public key via OOB, also a derivative of the public key, e.g. the hash of the public key, may be transferred. If a party offers its public key to another party, the other party computes the hash of that public key and checks whether the computed hash is the same as the hash received over OOB. An example of this is the use of Near Field Communication (NFC) as an OOB channel in the "Connection Handover" method in section 10.1.3 of the Wi-Fi Simple Configuration Technical Specification Version 2.05 [ref1].

Further improved strength against attackers trying to break the secrets can be achieved using elliptic curve cryptography. Elliptic curve cryptography (ECC) is an approach to public-key cryptography based on the algebraic structure of elliptic curves over finite fields. ECC requires smaller keys compared to non-ECC cryptography (based on plain Galois fields) to provide equivalent security. Elliptic curves are applicable for encryption, digital signatures, pseudo-random generators and other tasks. They are also used in several integer factorization algorithms that have applications in cryptography, such as Lenstra elliptic curve factorization. Public-key cryptography is based on the intractability of certain mathematical problems. Early public-key systems are secure assuming that it is difficult to factor a large integer composed of two or more large prime factors. For elliptic-curve-based protocols, it is assumed that finding the discrete logarithm of a random elliptic curve element with respect to a publicly known base point is infeasible, which is called the "elliptic curve discrete logarithm problem". The security of ECC depends on the ability to compute a point multiplication and the inability to compute the multiplicand given the original and product points. The size of the elliptic curve determines the difficulty of the problem. Various cryptographic schemes have been adapted based on such elliptic curves.

The exchange of credentials may further be controlled to be within a predefined location by initially requiring the use of a proximity based communication channel different from the wireless communication provided via the network. A well known example is called Wi-Fi Protected Setup (WPS, see [1]) introduced in 2006, the goal of the protocol being to allow home users who know little of wireless security and may be intimidated by the available security options to set up Wi-Fi Protected Access, as well as making it easy to add new devices to an existing network without entering long passphrases. The WPS standard emphasizes usability and security, and allows a few modes in a home network for adding a new device to the network: PIN, Push button or NFC. In the PIN method a personal identification number (PIN) has to be read from either a sticker or display on the new wireless device. This PIN must then be entered at a device representing the manager of the network, usually the network's access point. Alternately, a PIN provided by the access point may be entered into the new device. In the Push button method the user has to push a button, either an actual or virtual one, on both the access point and the new wireless client device. On most devices, this discovery mode turns itself off as soon as a connection is established or after a delay (typically 2 minutes or less), whichever comes first, thereby minimizing its vulnerability. A third method is based on Near Field Communication (NFC), in which the user has to bring the new client close to the access point to allow a near field communication between the devices. NFC Forum-compliant RFID tags can also be used in the WPS system. Support of this mode is optional. Such additional proximity based communication channel is usually called an out-of-band channel (OOB).

Radio-frequency identification (RFID) is the wireless use of electromagnetic fields to transfer data, for the purposes of automatically identifying and tracking tags attached to objects. The tags contain electronically stored information. Some tags are powered by electromagnetic induction from magnetic fields produced near the reader. Some types collect energy from the interrogating radio waves and act as a passive transponder. Other types have a local power source such as a battery and may operate at hundreds of meters from the reader. Unlike a barcode, the tag does not necessarily need to be within line of sight of the reader and may be embedded in the tracked object.

A further example based on near field communication (NFC) is described in [ref1], chapter 10 "NFC Out-of-Band Interface Specification" for WLAN configuration. Here an NFC Tag is to be provided at the Enrollee device. The NFC tag is used to physically transfer a device password from the Enrollee to an NFC-enabled Registrar at close range. The device password will then be used with an in-band registration protocol to provision the Enrollee with WLAN configuration data. An NFC Password Token may be integrated into the device if the device is portable and the manufacturer assumes no practical difficulty for the user to physically move the device close to a Registrar NFC Device. Such a network registrar device that enables a new device to access the network, i.e. enabling configuration of the network and the enrollee by having the enrollee and the network exchange the required credentials in a secure way, is from here called a configurator. In the known system of [ref1], the enrollee may be required to provide an enrollee password to a configurator at close range via an OOB channel. There are more ways described in [ref 1] to use the OOB channel, e.g. the exchange of hashes of public keys.

WO2010/023506 describes secure pairing and association for wireless devices, which devices enable use of a fixed secret value and fixed public key in a first device for use in pairing and association of the first device with a second device without compromising forward secrecy. The first and second devices may establish a first shared secret key in accordance with a public key agreement protocol based at least in part upon the fixed public key of the first device and a public key associated with the second device. The first shared secret key may be used for verification of a second shared secret key. The second shared secret key may be established based at least in part upon the public key associated with the second device and a fresh public key generated by the first device and may be used to facilitate encrypted communications between the devices.

SUMMARY OF THE INVENTION

Exchange of credentials in a secure way in public places is required, and the enrollee may be required to provide his credentials to the configurator. However, it may be bothersome for the user to bring his device in close proximity of a configurator, and/or it may be bothersome for the operator of the network to provide physical access to the configurator for each customer that wishes network access. Nevertheless the operator of such a network would like it that his customers can get secure access to his network in a very simple way, while both the enrollee and the configurator can be sure that no third party is able to access data transferred between the enrollee and the network and cannot interfere or play a man-in-the-middle role.

It is an object of the invention to provide a system for secure access to a public wireless network that enables a more convenient access for enrollees.

For this purpose, a network system, devices and methods are provided as defined in the appended claims.

The network system is arranged for wireless communication between network devices in an area, and for secure communication according to a security protocol. The network system comprises at least one network device arranged for wireless communication and arranged to act as an enrollee according to the security protocol for getting access to the network, to have a first enrollee public key and a corresponding first enrollee private key and to have a second enrollee public key and a corresponding second enrollee private key, a network device arranged to act as configurator and arranged to enable secure communication for the enrollee according to the security protocol, and to have a configurator public key and a corresponding configurator private key and to have, for the network system, a network public key and a corresponding network private key, the enrollee comprising an enrollee sensor and an enrollee processor arranged to acquire a data pattern via an out-of-band channel by the enrollee sensor, the data pattern being provided in the area and representing the network public key, derive a first shared key based the network public key and the first enrollee private key, encode the second enrollee public key using the first shared key, generate a network access request according to the security protocol, the network access request including the encoded second enrollee public key and the first enrollee public key, and transfer the network access request to the configurator via the wireless communication; the configurator comprising a configurator processor arranged to receive the network access request from the enrollee via the wireless communication, derive the first shared key based on the network private key and the first enrollee public key, decode the encoded second enrollee public key using the first shared key, verify whether the encoded second enrollee public key was encoded by the first shared key, and, if so, generate security data using the second enrollee public key and the configurator private key, derive a second shared key based on the first enrollee public key, the second enrollee public key and the network private key, protect cryptographically using the second shared key at least one of the security data and configurator public key, and generate a network access message according to the security protocol, the network access message including at least one of the protected security data and protected configurator public key;

the enrollee processor further arranged to receive the network access message from the configurator via the wireless communication, derive the second shared key based on the first enrollee private key, the second enrollee private key and the network public key, verify whether at least one of the protected security data and the protected configurator public key was cryptographically protected by the second shared key and, if so, engage the secure communication based on the second enrollee private key and the security data.

A first network device acts as configurator device, also called configurator. The configurator device comprises a configurator communication unit arranged to receive, from the enrollee device, the network access request according to the security protocol, the network access request including the encoded second enrollee public key and the first enrollee public key, and a configurator processor comprising a memory arranged to have, for the configurator device, the configurator public key and a corresponding configurator private key and to have, for the network system, the network public key and a corresponding network private key. The configurator processor is arranged to derive the first shared key based on the network private key and the first enrollee public key, decode the encoded second enrollee public key using the first shared key, verify whether the encoded second enrollee public key was encoded by the first shared key, and, if so, generate the security data using the second enrollee public key and the configurator private key, derive the second shared key based on the first enrollee public key, the second enrollee public key and the network private key, protect cryptographically, using the second shared key, at least one of the security data and the configurator public key, and generate the network access message according to the security protocol.

As the configurator configures the network and network devices entering the network, so-called enrollees, the configurator device must be able to communicate with other network devices wirelessly, directly or indirectly via a wireless communication device like an access point. As such, the configurator does not have to be part of the network itself, i.e. it may or may not be able to participate in communication across the network that is being configured.

A second network device acts as enrollee device, also called enrollee. The enrollee device comprises an enrollee wireless communication unit arranged for wireless communication;

an enrollee sensor arranged to acquire a data pattern via an out-of-band channel, the data pattern being provided in the area and representing the network public key;

and an enrollee processor comprising a memory arranged to have the first enrollee public key and a corresponding first enrollee private key and to have the second enrollee public key and a corresponding second enrollee private key. The enrollee processor is arranged to derive the first shared key based on the network public key and the first enrollee private key, encode the second enrollee public key using the first shared key, generate the network access request according to the security protocol, the network access request including the encoded second enrollee public key and the first enrollee public key, and transfer the network access request to the configurator device via the enrollee wireless communication unit.

The enrollee processor is further arranged to receive the network access message from the configurator via the enrollee wireless communication unit, derive the second shared key based on the first enrollee private key, the second enrollee private key and the network public key, verify whether at least one of the protected security data and the protected configurator public key was cryptographically protected by the second shared key and, if so, engage the secure communication based on the second enrollee private key and the security data.

In the context of the current network system the enrollee has an enrollee sensor that is able to receive information via a so-called out-of-band (OOB) channel, as elucidated above, from a so called data pattern that represents this information, for example a QR code, color pattern or NFC tag containing a data pattern representing the network public key.

In general, protecting the privacy and/or the integrity of data involves a form of encrypting and/or adding a cryptographic hash based on key material, which may be expressed by the general word 'encoding'. So encoding information with a key may mean encrypting the information with a key, e.g. by using AES. For example, the step of "protecting cryptographically at least one of the security data and configurator public key using the second shared key" has the following function. In this step protecting is a type of encoding, in which the security data and the configurator public key may, but need not be kept secret, so this step may or may not involve encryption with a key. But the receiving party must be sure that the "protected data" are correct, so it must be possible to check their integrity. So 'protecting' is to be interpreted as 'protecting for integrity', such as generating a cryptographic signature and/or 'encrypting' the material including further check data, checksums or other unique data. Protecting information cryptographically with a key may also mean protecting the integrity of the information with that key, which may be done by adding a cryptographic hash using the key over the information, so that parties that know the key can check the integrity of the information. One can also say that the cryptographic hash authenticates the information as originating from a party that knows the key. A cryptographic hash function is a hash function that besides the data to be hashed as input, also needs a key as input, with the resulting hash of course being dependent on the key, e.g. AES-SIV (refer to RFC 5297, [2]) accomplishes both encryption and integrity protection based on a key. The step 'verify whether . . . ' on the data as received embodies the check of integrity so as to achieve the integrity protection. This step may involve decryption, depending on the protection method used. If e.g. AES-SIV (refer to RFC 5297, [2]) is used for protection, the step 'verify whether . . . ' involves also the decryption of the data. Furthermore, 'protect at least one of the security data and configurator public key using the second shared key' can be interpreted as "generate integrity protection information for at least one of the security data and configurator public key using the second shared key" and then put the integrity protection information and the at least one of the security data and configurator public key in the network access message.

Advantageously, in the network system, the enrollee is enabled to efficiently engage the secure communication based on its own second enrollee private key and the security data as received via the network access message. Thereto the enrollee first establishes an effective out-of-band channel formed by using the enrollee sensor to acquire the data pattern. The data pattern is made available in the area where the network system manager intends to allow enrollees to access the network system. Then the enrollee initiates a security protocol using the wireless communication.

Further advantageously, the system manager controls the area where enrollees can enter the system, while credentials are securely exchanged with the configurator in a way that prevents a man-in-the-middle attack. By having the enrolling process initiated by the enrollee itself via the out-of-band channel a minimum number of wireless messages, i.e. the network request message and the subsequent network access message, suffice for said secure exchange of credentials.

Optionally a configurator device can set up another device to sign public keys on behalf of the configurator device. Such combination of devices is considered to be an implementation of the configurator as defined in the network system. One of the things that must be done by the configurator device is to give this other device its signing private key or to obtain the other device's signing public key, sign it with the configurator's signing private key, and send the signed other device's signing public key, and the configurator's signing public key to the other device. When the other device signs a public key from an enrollee, it sends in the second case its public signing key, the signature provided by the configurator and the configurator's public signing key to the enrollee, so the enrollee can check the signature of its public key and the signature over the other device's public signing key.

Optionally in the above network system, the configurator processor is arranged to generate a temporary network public key and a corresponding temporary network private key, which keys constitute the network public key and the corresponding network private key. This defines making the network key pair an ephemeral (temporary, one-time use) one. In a system where the network public key which is static, one of the previous enrollees might have put this public key on the Internet and anybody can contact the configurator. The advantage of the ephemeral key is that if an enrollee contacts the configurator over Wi-Fi and the network public key has been generated moments ago, the enrollee can only know this network public key, because it has obtained this key just before via the out of band mechanism.

Optionally in the above network system, the enrollee processor is arranged to generate a temporary enrollee public key and a corresponding temporary enrollee private key, which keys constitute the first enrollee public key and the corresponding first enrollee private key; and/or the enrollee processor is arranged to generate a further temporary enrollee public key and a corresponding further temporary enrollee private key, which keys constitute the second enrollee public key and the corresponding second enrollee private key. The advantage of such an ephemeral key is that if an enrollee communicates with the configurator over Wi-Fi and the key has been generated a moment ago, only the enrollee and the configurator can know this key, because it has just been generated.

Optionally in the above system, the security data is authorization information from the configurator, which authorization information authorizes the enrollee to access the network. Advantageously, such security data can be used to authorize the enrollee to access the network.

Optionally in the above network system, the configurator processor is further arranged to generate the security data by providing a configurator session key and transferring the configurator session key to the enrollee; and the enrollee processor is further arranged to receive the configurator session key and engage the secure communication based on the configurator session key. For example, the configurator session key may be a Wi-Fi passphrase known as such. The embodiment enables to transfer the Wi-Fi passphrase of a legacy access point to an enrollee that is implemented according to the invention.

Optionally in the above network system, the configurator processor is further arranged to generate a further message including the second enrollee public key and the digital signature, and transfer the further message to a further device for enabling secure communication between the enrollee and the further device. Advantageously, the configurator also distributes the second enrollee public key and the digital signature to further network devices, and so controls and authorizes the secure communication with the enrollee. A similar message may be send to the enrollee for verifying the signature.

Optionally in the above network system, the enrollee processor is further arranged to receive the further public key and the further digital signature from the configurator or from the further network device. Advantageously, the enrollee receives credentials that are authorized by the configurator, either from the configurator or from the further network device. When the enrollee receives such credentials from the further network device a direct set up of secure communication to the further device is enabled.

Optionally in the above network system, the configurator processor is further arranged to generate the security data by generating a configurator session public key and a corresponding configurator session private key, deriving a third shared key based on the configurator session private key and the second enrollee public key and transferring the configurator session public key to the enrollee. The enrollee processor is further arranged to receive the configurator session public key, derive the third shared key based on the second enrollee private key and the configurator session public key and engage secure communication based on the third shared key. Advantageously generating such a configurator session public/private key pair enables further secure communication between enrollee and configurator based on the third shared key.

Optionally in the above network system, the enrollee processor is further arranged to generate an enrollee session public key and a corresponding enrollee session private key, derive a fourth shared key based on the enrollee session private key and the configurator public key and transferring the enrollee session public key to the configurator; and the configurator processor is further arranged to derive the fourth shared key based on the configurator private key and the enrollee session public key and engage secure communication based on the fourth shared key. Advantageously, the enrollee may so generate a session key pair, and use the private/public key pair for deriving a further shared key.

Optionally in the above network system, the network system comprises a further network device arranged to receive the second enrollee public key and the security data, provide a session network public key and a corresponding session network private key, derive a fifth shared key based on the session network private key and the second enrollee public key and transferring the session network public key to the enrollee. The enrollee processor is further arranged to receive the session network public key, derive the fifth shared key based on the second enrollee private key and the session network public key, and engage securely communication with the further network device based on the fifth shared key. Advantageously generating such a further session network public/private key pair enables further secure communication between enrollee and further network device based on the fifth shared key Optionally in the above network system, the configurator processor is further arranged to generate the security data comprising a digital signature by digitally signing the second enrollee public key with the configurator private key, to transfer the digital signature to a third device and/or to the enrollee for enabling secure communication between the enrollee and the third device. By transferring the digital signature of the configurator to a third device, the digital signature enables secure communication between the enrollee and the third device. Advantageously, the configurator provides the digital signature as the security data for the second enrollee public key, so that the third device can verify that said second enrollee public key is to be trusted.

Furthermore optionally in the preceding network system, the enrollee processor is further arranged to receive the digital signature, verify, based on the digital signature and the configurator public key, whether the second enrollee public key was correctly signed and, if so, engage the secure communication based on the second enrollee private key. Advantageously, the enrollee can detect whether the configurator has correctly signed the second enrollee public key.

Furthermore optionally in the preceding network system, the network system comprises a further network device arranged to obtain the configurator public key, receive the digital signature and the second enrollee public key, verify, based on the digital signature and the configurator public key, whether the second enrollee public key was correctly signed and, if so, engage the secure communication with the enrollee based on the second enrollee public key. Advantageously, the further network device can detect whether the configurator has correctly signed the second enrollee public key, and engage the secure communication.

Optionally in the above network system, the configurator processor is further arranged to generate further security data comprising a further digital signature by digitally signing, with the configurator private key, a further public key of a further network device. The enrollee processor is further arranged for using the further security data by receiving the further public key and the further digital signature, verifying, based on the further digital signature and the configurator public key, whether the further public key was correctly signed and, if so, securely communicating with the further network device using the second enrollee private key and the further public key. Advantageously, the enrollee can detect whether the configurator has correctly signed the further public key, and engage the secure communication.

Optionally in the above network system, the enrollee processor is further arranged to generate enrollee test data, encode the enrollee test data using the second shared key, transfer the encoded enrollee test data to the configurator. The configurator processor is further arranged to decode the encoded enrollee test data using the second shared key, verify whether the enrollee test data was encoded by the second shared key at the enrollee. Advantageously, if the enrollee has performed something wrong anywhere in the protocol up to now, e.g. accidentally mixing up configurators and replying to the wrong one, the configurator can know the error based on the received test data and the test that it computes itself. Such test data can be considered to authorize the enrollee to the configurator.

Optionally in the above network system, the configurator processor is further arranged to generate configurator test data, encode the configurator test data using the second shared key, transfer the encoded configurator test data to the enrollee. The enrollee processor is further arranged to decode the encoded configurator test data using the second shared key, verify whether the configurator test data was encoded by the second shared key at the configurator. Advantageously, if the configurator has performed something wrong anywhere in the protocol up to now, e.g. accidentally mixing up enrollees and replying to the wrong one, the enrollee can know the error based on the received test data and the test that it computes itself. Such test data can be considered to authorize the configurator to the enrollee.

Various operational elements in the above system may be implemented by performing respective methods as also further defined in the appended claims.

The enrollee method comprises
storing the first enrollee public key and a corresponding first enrollee private key and the second enrollee public key and a corresponding second enrollee private key,
acquiring a data pattern (140) via an out-of-band channel, the data pattern being provided in the area and representing the network public key,
deriving the first shared key based on the network public key and the first enrollee private key,
encoding the second enrollee public key using the first shared key,
generating the network access request according to the security protocol, the network access request including the encoded second enrollee public key and the first enrollee public key, and
transferring the network access request to the configurator device via the enrollee wireless communication unit.

The enrollee method further comprises
receiving the network access message from the configurator,
deriving the second shared key based on the first enrollee private key, the second enrollee private key and the network public key,
verifying whether at least one of the protected security data and the protected configurator public key was cryptographically protected by the second shared key and, if so,
engaging the secure communication based on the second enrollee private key and the security data.

The configurator method comprises
storing, for the configurator device, the configurator public key and a corresponding configurator private key and, for the network system, the network public key and a corresponding network private key,
receiving, from the enrollee device, the network access request according to the security protocol, the network access request including the encoded second enrollee public key and the first enrollee public key,
deriving the first shared key based on the network private key and the first enrollee public key,
decoding the encoded second enrollee public key using the first shared key,
verifying whether the encoded second enrollee public key was encoded by the first shared key, and, if so,
generating the security data using the second enrollee public key and the configurator private key,
deriving the second shared key based on the first enrollee public key, the second enrollee public key and the network private key,
protecting cryptographically, using the second shared key, at least one of the security data and the configurator public key, and
generating the network access message according to the security protocol.

Also, the elements or methods in the above system may be implemented by respective devices for use in a network system as defined above. The device comprises a wireless transceiver arranged for the wireless communication. The device is arranged to act as configurator and comprising a device processor arranged to be the configurator processor as defined in the above system. The device may alternatively be arranged to act as enrollee and comprising a device processor arranged to be the enrollee processor as defined in the above system.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. Preferably, the computer program product comprises non-transitory program code means stored on a computer readable medium for performing a method according to the invention when said program product is executed on a computer. In a preferred embodiment, the computer program comprises computer program code means adapted to perform all the steps or stages of a method according to the invention when the computer program is run on a computer. Preferably, the computer program is embodied on a computer readable medium.

Another aspect of the invention provides a method of making the computer program available for downloading, for example the location based application. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
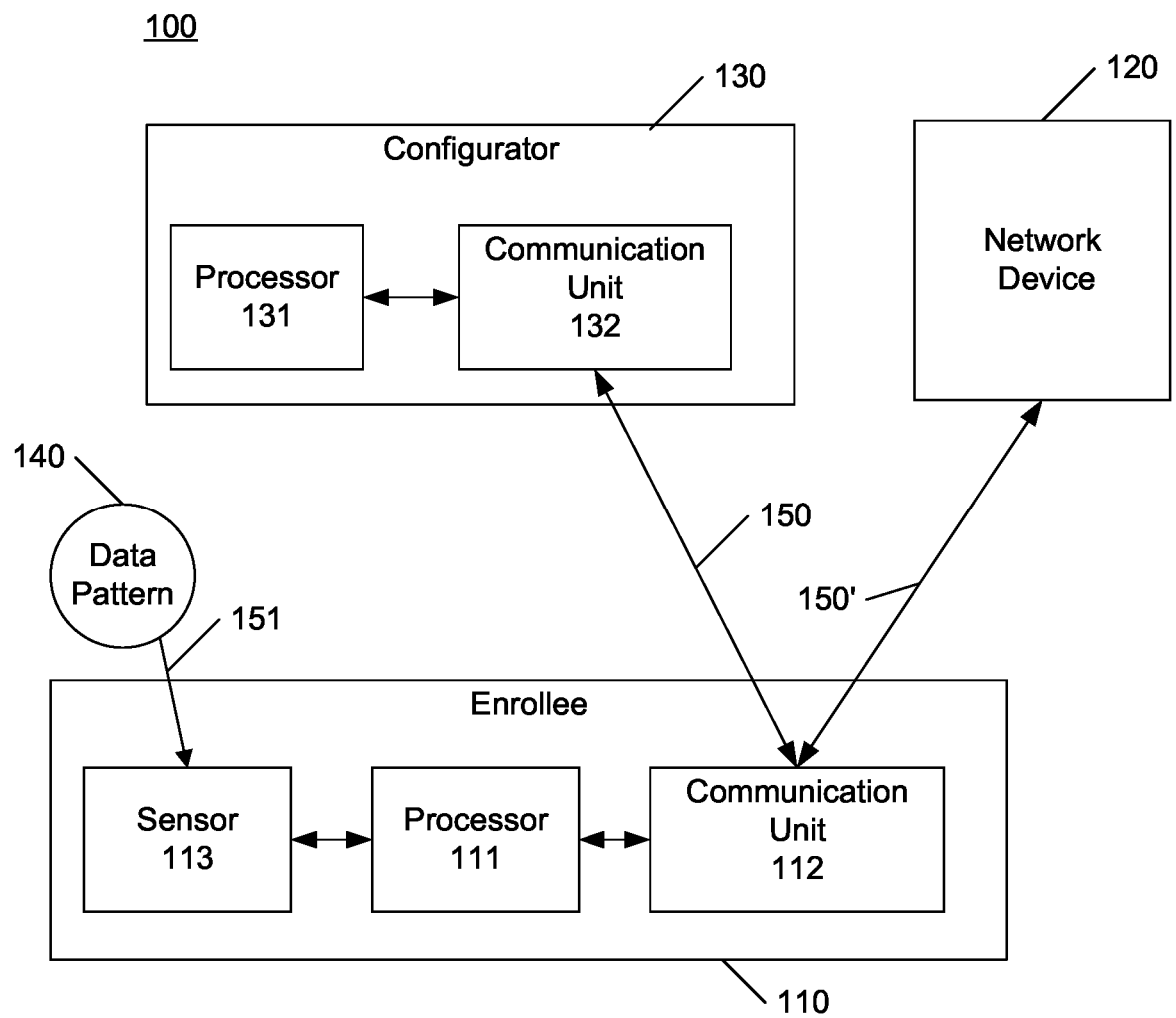
FIG. 1 shows a network system.

In order to get access to a network, an enrollee needs to transfer its information to one or more other devices on the network, e.g. a configurator and/or an Access Point (AP) in a Wi-Fi network. The enrollee then receives and checks signed network access information and aborts in case it finds an error, e.g. in case the signature verification of the signed network access information fails. Another device that receives signed network access information can perform signature verification on the signed network access information to find out that it has been correctly signed by a common Configurator. If so, the other device knows that it can trust the enrollee public network access encryption information contained in the received signed network access information and that it can use this information in a shared key derivation algorithm to create a link key between the enrollee and itself. The other device will have to send its own signed network access information to the Enrollee, so the Enrollee can perform a similar check and derive the same link key. From then on, the Enrollee and the other device can base the protection of their wireless link on the derived link key. The derived link key can e.g. be used as a pairwise master key (PMK) in a Wi-Fi network. The enrollee public network access encryption information may be in the form of a public Elliptic Curve Cryptography (ECC) key or a public RSA (Rivest-Shamir-Adleman cryptosystem) key, or may be the public identity of an identity-based cryptosystem, such as HIMMO [3].

The proposed network system, also named a public network system, provides a convenient way of setting up wireless communication for mobile devices in a selected area, for example in a shop or at an airport lounge, waiting area or gate. In such cases the owner of the network does not care who gets access to his network, but does care about the network set-up (SSID, frequency band, channel, etc.) and does want to provide link protection on his network in order to protect the privacy of the communications of all devices on the network. Public places like restaurants and cafes may operate such networks. It is very bothersome for the operator of the network to go with a configurator device to each customer that wished network access. Typically in this type of network, it is the AP that is in charge of it, but devices like APs are usually not equipped with camera's and even if they were, it is very inconvenient for user that want to get access to the network, to get near such an AP (it may even be mounted on the ceiling), operate its camera end get access. Using other OOB methods is also very cumbersome in this case (making a USB connection with an AP mounted on the ceiling? Performing an NFC touch with an AP on the ceiling? Setting up a secure Bluetooth link with an AP?) The operator of such a network would like it that his customers can get secure access to his network in a very simple way.

Similarly for e.g. a public printer in a managed environment, the owner of the printer will want to manage the spectrum use on his premises and set the frequency band and channel of the public printer. Yet the owner wants to have everybody access to this printer, but in a secure way. Such a printer may be equipped with a camera or a scanner to read the public encryption information from a smart phone with which a user wants to print something, but the user interface of a printer is much more difficult to get user friendly and intuitively to use than the one of a smart phone. However, it would be convenient for a user that wants to print something on his smart phone to capture the public encryption information of the printer, e.g. in the form of a public RSA or ECC-key or the public identity of an identity-based encryption scheme, with the camera of the smart phone and then start a print job on his smart phone using the information captured with the camera as the destination of the print job.

Similarly for a public wireless docking center, a wireless docking center may be connected wirelessly or in a wired fashion to several peripheral devices like a monitor, keyboard, mouse, speakers, etc. or have some of these as a built-in peripheral and may be able to offer the use of these peripherals over a wireless channels to wireless dockees. Such a wireless docking center may be set up using a configurator, such that the wireless docking center is going to be securely connected to the wireless peripherals. The configurator will then set up the wireless docking center such that the wireless docking center becomes the configurator of itself and the wirelessly connected peripheral devices. The configurator may give the wireless docking center some rules on which wireless dockees are allowed to use the wireless docking center. Such a wireless docking center may be equipped with a camera or a scanner to read the public encryption information, e.g. a public ECC or RSA key, from a smart phone with which a user wants to use the wireless docking center, i.e. dock with the wireless docking center. However, it would be convenient for a user that wants to dock to the wireless docking center with his smart phone to capture the public encryption information of the wireless docking center with the camera of the smart phone and then use the wireless docking center. The wireless docking center, may display (possibly dynamic) public encryption information on e.g. its screen, or have static public encryption information printed on e.g. its housing.

In the proposed network system, instead of the configurator reading out-of-band the public encryption information of the enrollee, the enrollee reads the out-of-band public encryption information of the configurator. Note that for many OOB methods, the device which OOB information is read does not have to be aware that this information is read. This is true for e.g. when a code is read by a camera, scanner or human, when an NFC tag without electrical connection to the device is being read, etc.

Optionally, at the start of the wireless part of the protocol, it may be determined which device is going to configure the other. That means that the devices perform a negotiation of who is going to configure whom. Also, a mutual configuration may be engaged. Adding such a negotiation phase in the protocol would add (at least) two more messages if done in a straight-forward way.

It is proposed that the enrollee reads out-of-band public encryption information of the configurator, e.g. representing a network public key, and initiates the wireless part of the protocol, so the enrollee now is the initiator of the protocol. The network public key may also be called "configurator identity public key".

The enrollee then sends a first message including enrollee public network access encryption information (named second enrollee public key later on) to further information encrypted with a shared key, as elucidated below. This indicates to the other party, the configurator or responder, that it is supposed to configure the initiator of the protocol. Via such action, the responder has the public network access encryption information that it needs to sign for giving the initiator access to the network it is managing.

Alternatively or additionally, if the responder sends its public network access encryption information to the initiator, this might be used to signal that the responder also wants to be configured by the initiator.

Wireless technologies usually support methods with which devices can let other devices know wirelessly what they are capable of They can e.g. advertize their capabilities, i.e. they broadcast a special message with their capabilities. They can e.g. listen to discovery messages and on the receipt of such a message that they think is meant for them, reply with a message that contains information on their capabilities and possibly other information. A configurator device as proposed may have in its capability list that it can configure other devices (enrollees) according to the proposed security protocol, which requires enrollees to read OOB public encryption information and ask to be configured themselves.

The network devices cooperating according to the protocol have been called enrollee (or initiator) and configurator (or responder). In a general case, where it is uncertain which is going to configure the other, other names may be used. If a first network access message contains public network access encryption information, the sender wants to be configured by a configurator in the responder. The responder then sends the signed network access information. Further enrolment information like attributes may also be included with the public network access encryption information in an early message of the proposed protocol.

FIG. 1 shows a network system. The network system is arranged for wireless communication 150,150' such as Wi-Fi between network devices in an area, and is arranged for secure communication according to a security protocol as explained below. Further specific aspects of the protocol are described with reference to FIGS. 2 to 5.

The network system 100 comprises multiple network devices (110,120,130), each network device being able to interact via the network using predefined communication protocols and security protocols. The network is arranged to provide access to further network devices in an area, for example to provide network services to devices in the vicinity. For example, the network system may include an access point (AP) acting as a coupling center for other network devices that are associated with that AP, e.g. mobile phones or laptops which have set up a link key with the AP. Communication between network devices with one another and with other networks, e.g. the corporate intranet or the Internet may go via the AP. The devices may able to communicate directly, so not through devices like an AP, and may be able to set up link keys with one another.

The Figure shows an enrollee 110, i.e. a network device that intends to participate in the network in said area acting as enrollee. The enrollee as shown has an enrollee sensor 113, an enrollee processor 111 and an enrollee wireless communication unit 112, which are arranged to engage the secure communication according to the predefined communication protocols and security protocols.

The Figure shows a configurator 130, i.e. a further network device in the network system acting as configurator. This may be a separate network device, or a role embedded in an access point or other network device. The configurator as shown has a configurator processor 131 and a configurator communication unit 132, which units are arranged to communicate with the enrollee according to the predefined communication protocols and security protocols as explained below. The configurator communication unit may be a wireless communication unit. The configurator communication unit may also communicate via some other network channel to an access point, which access point then wirelessly communicates with the enrollee. To enable the configurator to control access to the network system as elucidated below the configurator has various credentials, such as a configurator public key and a corresponding configurator private key.

The network system 100 may comprise at least one further network device 120 that is already part of the network and may be available for secure communication with the enrollee. The further device has a further device processor and a further wireless communication unit which are arranged to engage the secure communication according to the predefined communication protocols and security protocols.

The enrollee is arranged to act according to the security protocol for getting access to the network. In operation the enrollee has, in a memory of the enrollee processor, a first enrollee public key and a corresponding first enrollee private key and also has a second enrollee public key and a corresponding second enrollee private key. The configurator is arranged to enable secure communication for the enrollee according to the security protocol. In operation the configurator has, in a memory of the configurator processor, a configurator public key and a corresponding configurator private key for the configurator device and, for the network system, a network public key and a corresponding network private key.

The enrollee sensor and enrollee processor are arranged to acquire a data pattern 140 via the enrollee sensor 113 is indicated by a dashed arrow 151 in the Figure. The data pattern is provided in the area and represents the network public key. For example, the data pattern may be a barcode or QR pattern. Acquiring the data pattern via the sensor constitutes an out-of-band channel (OOB). Various examples of such OOB channels and patterns have been discussed in the introduction. The OOB as constituted by the sensor acquiring the pattern operates in one direction, i.e. obtaining information from the network to the enrollee. The enrollee sensor may be any suitable detector or receiver that can detect or receive the pattern that is used in the actual system setup, as such pattern may be provided in several ways. The pattern is provided for the network system in an area that is intended for users of other network devices, which are potentially admitted to access the network. The area may be an office, a shop, a public location, an airfield, etc. The pattern may, for example, be a QR code or a bar code, and the corresponding sensor is a camera or IR beam detector of a mobile network device. The pattern may be provided on paper, e.g. a menu or a receipt, or may be shown on a display, or in some other physical form. The OOB channel may also be NFC or Bluetooth in the event that the network communication (in band) is based on Wi-Fi, so then the enrollee sensor is a Bluetooth unit or NFC tag detector. So the sensor refers to any suitable detector or receiver for detecting the data pattern using an out-of band channel, i.e. a channel using another technology other than the wireless communication technology of the network.

The enrollee processor is arranged to derive a first shared key based the network public key and the first enrollee private key. As such, deriving shared keys using public/private key pairs has been is known, and has been elucidated in the introduction. The enrollee processor is arranged to subsequently encode the second enrollee public key using the first shared key. Then the enrollee processor generates a network access request according to the security protocol. The network access request includes the encoded second enrollee public key and the first enrollee public key. The enrollee processor is arranged to transfer the network access request to the configurator via the wireless communication. The network access request message and subsequent messages may be in the form of so-called action frames or self-protected action frames as defined by IEEE 802.11 (2012) [4].

The configurator processor 131 is arranged to receive the network access request from the enrollee via the wireless communication, either directly via the configurator communication unit 132 or via some other wireless receiver in the network like an access point. The configurator processor also derives the first shared key based on the network private key and the first enrollee public key. The configurator processor subsequently decodes the encoded second enrollee public key using the first shared key, for example by decrypting the encoded data by a predefined cryptographic method using the first shared key. Next the configurator processor cryptographically verifies whether the encoded second enrollee public key was encoded by the first shared key. If the encoding was correct, the configurator processor decides to allow access to the network for the enrollee and proceeds to generate security data using the second enrollee public key and the configurator private key. The configurator processor derives a second shared key based on the first enrollee public key, the second enrollee public key and the network private key. How multiple keys can be used has been elucidated before in the introduction. Next, the configurator processor cryptographically protects at least one of the security data and configurator public key, while using the second shared key. For example as the security data, a signature may be calculated or a further session key may be generated. Further detailed examples are discussed below. The configurator processor then generates a network access message according to the security protocol. The network access message includes the cryptographically protected data, i.e. at least one of the protected security data and protected configurator public key.

The configurator role has at least two key pairs. The first pair is for setting up the first shared secret with an enrollee. This key may change over time or may be constant. The second pair is a key pair used for signing the second enrollee public key (or public network key) of the enrollee, so that other devices that have been enrolled by the same configurator (or a device that can sign on behalf of the configurator) know that they can trust the second enrollee public key and use it to derive a link key. A possible third key pair of the configurator may be used to set up a further shared secret. This third pair will be an ephemeral pair (i.e. temporary key material for one-time use).

All devices in the network that have their second enrollee public key signed by the configurator (or one of the devices acting on behalf of the configurator) can exchange their second public keys and use these in a Diffie-Hellman shared key derivation protocol, e.g. the 4-way handshake from IEEE 802.11 (2012) [4], to derive a link key to protect their future wireless communication. These signed public keys may be called 'signed network access information'.

The enrollee processor is further arranged to receive the network access message from the configurator via the wireless communication. If such message is received the enrollee processor proceeds with the enrolling process as follows. The enrollee processor derives the second shared key based on the first enrollee private key, the second enrollee private key and the network public key. Next the enrollee processor verifies whether at least one of the protected security data and the protected configurator public key was cryptographically protected by the second shared key. If the encoding was correct, the enrollee processor decides to access the network and proceeds to engage the secure communication based on its second enrollee private key and the security data. The secure communication may be further communication with the configurator, or with other devices in the network. Various examples of embodiments, which may be combined where appropriate, are discussed now.

In an embodiment of the above network system, the enrollee processor is arranged to generate a temporary enrollee public key and a corresponding temporary enrollee private key, which keys constitute the first enrollee public key and the corresponding first enrollee private key. Such temporary keys may be generated by a random data generator, which produces a required number of random bits, defining the private key, and subsequently calculating the corresponding public key, e.g. as elucidated in the introduction. Using such temporary keys increases security, because attackers cannot use any knowledge from previous sessions.

In an embodiment of the above network system, the enrollee processor is arranged to generate a further temporary enrollee public key and a corresponding further temporary enrollee private key, which keys constitute the second enrollee public key and the corresponding second enrollee private key. Using a further temporary enrollee public and private key pair further increases security when using such temporary keys for engaging secure communication with different network devices.

In an embodiment of the above network system, the configurator processor is arranged to generate a temporary network public key and a corresponding temporary network private key, which keys constitute the network public key and the corresponding network private key. Using a temporary network public and private key pair further increases security when using such temporary keys by the configurator. Also a corresponding data pattern must be generated and exposed (e.g. printed or displayed) to make the temporary network public key available via the OOB channel.

In an embodiment of the above network system, the security data is authorization information from the configurator, which authorization information authorizes the enrollee to access the network. For example, the authorization information comprises a signature generated by the configurator of data already known to the enrollee, or further data such as a certificate containing identification data of the configurator or the network and one or more corresponding signatures, and/or respective public key(s), or a signed public key of the enrollee (also called a connector).

In an embodiment of the above network system, the configurator processor is further arranged to generate the security data by providing a configurator session key and transferring the configurator session key to the enrollee. Also, the enrollee processor is further arranged to receive the configurator session key and engage the secure communication based on the configurator session key. The configurator session key may be protected by encryption during transfer. For example, the configurator session key may be a Wi-Fi passphrase known as such. The embodiment enables to transfer the Wi-Fi passphrase of a legacy access point to an enrollee that is implemented according to the invention.

In an embodiment of the above network system, the configurator processor is further arranged to generate the security data by generating a configurator session public key and a corresponding configurator session private key, and deriving a third shared key based on the configurator session private key and the second enrollee public key and transferring the configurator session public key to the enrollee. Also the enrollee processor is further arranged to receive the configurator session public key, derive the third shared key based on the second enrollee private key and the configurator session public key and engage secure communication based on the third shared key.

Optionally in the above system, the enrollee processor is further arranged to generate an enrollee session public key and a corresponding enrollee session private key, derive a fourth shared key based on the enrollee session private key and the configurator public key and transferring the enrollee session public key to the configurator; and the configurator processor is further arranged to derive the fourth shared key based on the configurator private key and the enrollee session public key and engage secure communication based on the fourth shared key.

In an embodiment the above network system comprises a further network device arranged to receive the second enrollee public key and the security data, and provide a session network public key and a corresponding session network private key. The further network device derives a fifth shared key based on the session network private key and the second enrollee public key, and transfers the session network public key to the enrollee. Also the enrollee processor is further arranged to receive the session network public key, and derive the fifth shared key based on the second enrollee private key and the session network public key. Next the enrollee is enabled to engage secure communication with the further network device based on the fifth shared key.

In an embodiment of the above network system, the configurator processor is further arranged to generate the security data comprising a digital signature by digitally signing the second enrollee public key with the configurator private key, and to transfer the digital signature to a third device and/or to the enrollee for enabling secure communication between the enrollee and the third device. A valid signature enables secure communication, because the signature gives trust to a device. The key used for the communication need not be based on the signature as such. The secure communication may be based on several elements, like a key, but also on a signature over a public key, because the device receiving a signed public key will trust that public key and, for example, use it for setting up a secure channel using Diffie-Hellman, because it trusts the device that has signed the public key. The trusted signer may be the configurator.

In an embodiment of the above network system, the configurator processor is further arranged to generate a further message including the second enrollee public key and the digital signature, and transfer the further message to a further device and/or to the enrollee. As the further device now has the second enrollee public key and the digital signature as provided by the configurator, secure communication between the enrollee and the further device is enabled.

In an embodiment of the above network system, the enrollee processor is further arranged to receive the digital signature. The enrollee processor cryptographically verifies, based on the digital signature and the configurator public key, whether the second enrollee public key was correctly signed. If so, the enrollee knows that the intended configurator has signed, and the enrollee can, based on the second enrollee private key, engage secure communication with other network devices that have been configured via the intended configurator.

In an embodiment the above network system comprises a further network device arranged to obtain the configurator public key and receive the digital signature and the second enrollee public key. The further network device verifies, based on the digital signature and the configurator public key, whether the second enrollee public key was correctly signed and, if so, engage the secure communication with the enrollee based on the second enrollee public key.

In an embodiment of the above network system, the configurator processor is further arranged to generate further security data comprising a further digital signature by digitally signing, with the configurator private key, a further public key of a further network device. Also, the enrollee processor is further arranged for using the further security data by receiving the further public key and the further digital signature and cryptographically verifying, based on the further digital signature and the configurator public key, whether the further public key was correctly signed. If so, the enrollee may securely communicate with the further network device using the second enrollee private key and the further public key. Also, the enrollee processor may further be arranged to receive the further public key and the further digital signature from the configurator or from the further network device.

In an embodiment of the above network system, the enrollee processor is further arranged to generate enrollee test data, encode the enrollee test data using the second shared key, and transfer the encoded enrollee test data to the configurator. Also, the configurator processor is further arranged to decode the encoded enrollee test data using the second shared key, and cryptographically verify whether the enrollee test data was encoded by the second shared key at the enrollee. Such test data can be considered to authorize the enrollee to the configurator.

In an embodiment of the above network system, the configurator processor is further arranged to generate configurator test data, encode the configurator test data using the second shared key, and transfer the encoded configurator test data to the enrollee. Also the enrollee processor is further arranged to decode the encoded configurator test data using the second shared key, and cryptographically verify whether the configurator test data was encoded by the second shared key at the configurator. Such test data can be considered to authorize the configurator to the enrollee.

In the following the network system and security protocols are described in detail with reference to FIGS. 2-5.

Figure 2:
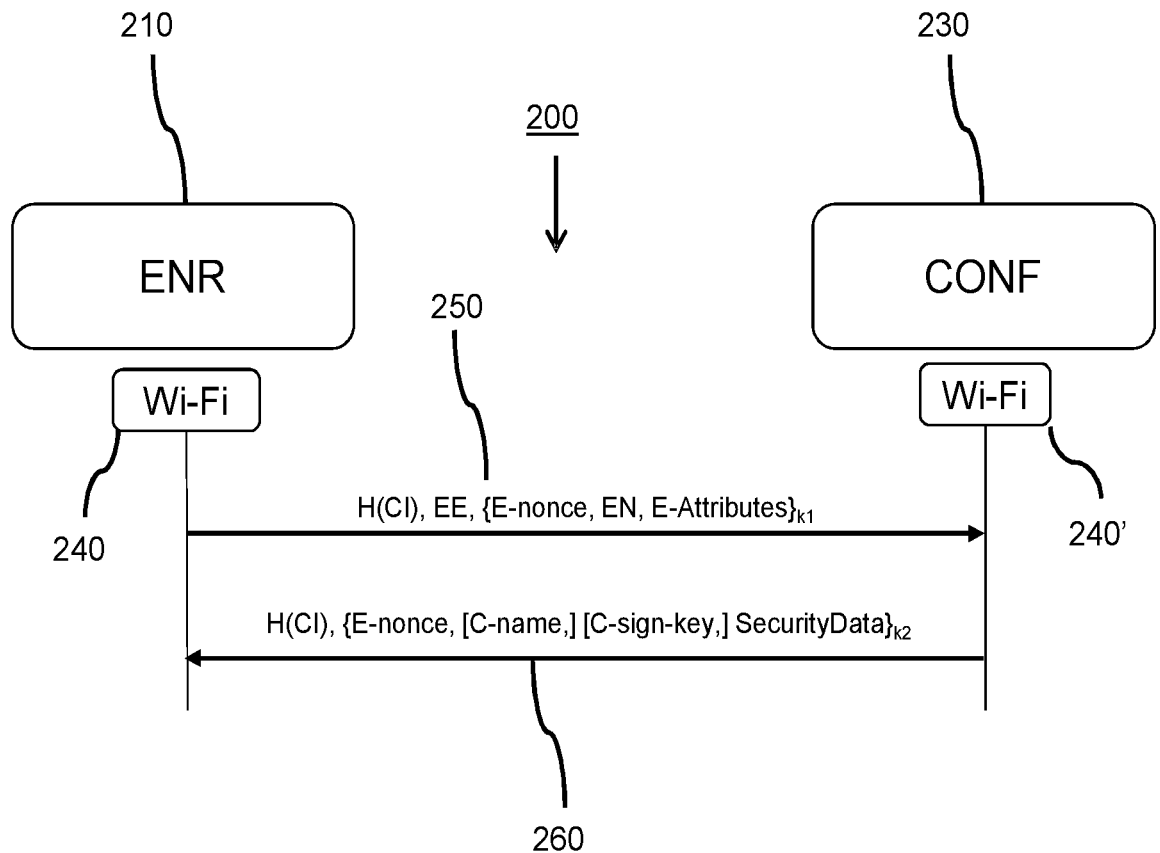
FIG. 2 shows a first example of a network system and security protocol.

FIG. 2 shows a first example of a network system and security protocol.

Aspects of the system that correspond to the system described above with reference to FIG. 1 are not repeated here. An enrollee 210 is shown to communicate wirelessly according to a security protocol 200 with a configurator 230. Both devices are shown to communicate via a respective Wi-Fi unit 240, 240'.

In the example, the security protocol provides authentication using two messages. The first message is a network access request 250, which contains the following elements: H(CI), EE, {E-nonce, EN, E-Attributes}$_{k1}$ The second message is a network access response 260, which has the following elements: H(CI), {E-nonce, [C-name,] [C-sign-key,] SecurityData}$_{k2}$ In the message the following elements are given:
H(CI) in the messages is a hash over Configurator Identity data, such as configurator public key;
{Information}$_k$ indicates information that is encrypted with key k;
[Info] indicates optional information;
EE in the message is a first enrollee public key;
EN in the first message is a second enrollee public key;
E-attributes is data defining the required network access;
$K_1$ is a first shared key based the network public key and the first enrollee private key;
$K_2$ is a second shared key based on the first enrollee public key, the second enrollee public key and the network private key;
E-nonce is a nonce provided by the enrollee;
C-name is a name provided by the configurator;
C-sign-key is a configurator reference of a public signature key or the configurator public signature key itself;
SecurityData may be a signed public key of the enrollee EN, a Wi-Fi passphrase, etc.

H(CI) which is used as an indicator that this message is meant for the configurator, without making the configurator public key available to the rest of the world. H(CI) in other messages is used as a simple way to link the messages. The repetition of the nonces in messages is also meant to link the messages, but now in a cryptographically protected way, since any device can respond with a message starting with H(CI).

The second message may comprise a certificate which may consist of a configurator name (C-name), a configurator reference of a signature key (C-sign-key), and the SecurityData. The SecurityData may be signed by Configurator. The public key of Enrollee (EN) may be in the SecurityData.

Figure 3:
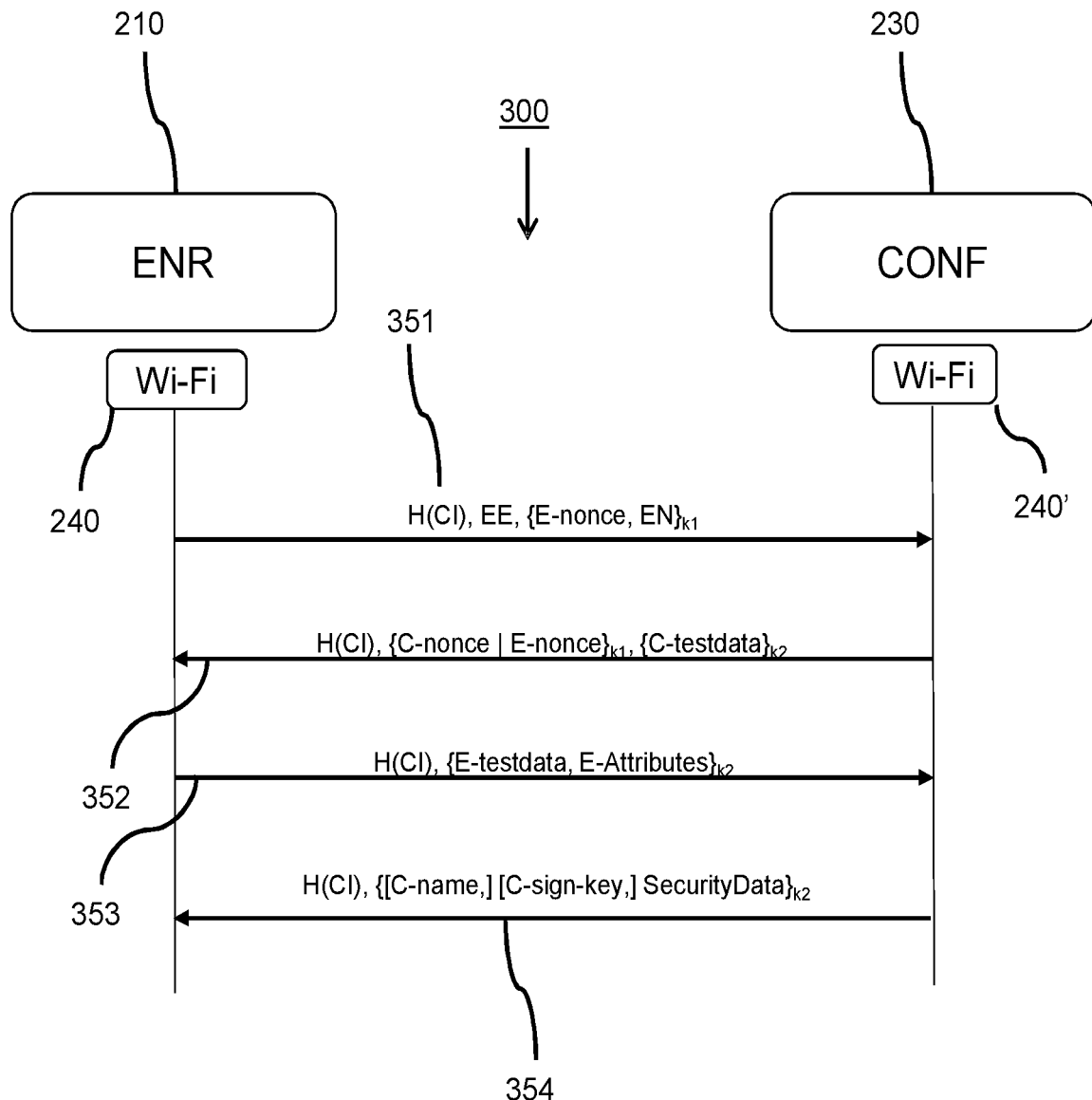
FIG. 3 shows a second example of a network system and security protocol.

FIG. 3 shows a second example of a network system and security protocol. Aspects of the protocol that correspond to the system described above with reference to FIG. 2 are not repeated here. In the example, the security protocol 300 provides authentication using four messages. The protocol provides authentication with two extra messages for more secure authentication compared to the above protocol 200.

The first message is a network access request 351, which contains the following elements: H(CI), EE, {E-nonce, EN}$_{k1}$ The second message is an authentication response 352 and contains the following elements: H(CI), {C-nonce|E-nonce}$_{k1}$, {C-testdata}$_{k2}$ The third message is an authentication confirm 353 and contains the following elements: H(CI), {E-testdata, E-Attributes}$_{k2}$ The fourth message is a network access response 354 and contains the following elements: H(CI), {[C-name,] [C-sign-key,] SecurityData}$_{k2}$ In the exemplary embodiment the elements are named as follows:
configurator (230)
configurator public encryption information (CI)
configurator private encryption information (CIpr)
first authorization information (C-testdata)
encrypted first authorization information ({C-testdata})
second authorization information (E-testdata)
encrypted second authorization information ({E-testdata})
wireless output means (240')
enrollee (210)
input means (113)
enrollee public network access encryption information (EN)
enrollee private network access encryption information (ENpr)
encrypted enrollee public network access encryption information ({EN})
enrollee public temporary encryption information (EE)
enrollee private temporary encryption information (EEpr)
second enrollee (120)
first signed network access information (SecurityData)
first shared key (k1)
second shared key (k2)
second signed network access information (SecurityData2)
wireless communication (150,150)

In the exemplary embodiment of the network system the protocol proceeds as follows. The wireless communication system has at least one configurator (230) and at least one an enrollee (210). The configurator (230) and the enrollee (210) arranged for communication over wireless communication. The enrollee (210) comprises an enrollee processor (112) and input means (113) using a technology other than the wireless communication for reading or inputting configurator public encryption information (CI). The enrollee also has enrollee public network access encryption information (EN) and associated enrollee private network access encryption information (ENpr). The enrollee processor is arranged for
generating enrollee public temporary encryption information (EE) and associated enrollee private temporary encryption information (EEpr),
computing a first shared key (k1) using at least the configurator public encryption information (CI) and the enrollee private temporary encryption information (EEpr),
encrypting the enrollee public network access encryption information (EN) with the first shared key (k1) to form the encrypted enrollee public network access encryption information ({EN}),
sending the enrollee public temporary encryption information (EE) with the encrypted enrollee public network access encryption information ({EN}) to the configurator (230) over wireless communication.

It is noted that sending the public network key (EN) of the enrollee means that the initiator of the protocol is an enrollee wishing to be enrolled in the network of the responding partner and that the initiator of the protocol is not acting as a configurator that wishes to configure the responder as an enrollee in one of the networks managed by the initiator of the protocol.

Subsequently, the enrollee processor may be arranged for, in a further message,
receiving over wireless communication encrypted first authorization information ({C-testdata}) from configurator (230),
computing second shared key (k2) using at least the configurator public encryption information (CI), the enrollee private temporary encryption information (EEpr) and the enrollee private network access encryption information (ENpr),
decrypting the encrypted first authorization information ({C-testdata}) from the configurator (230) to obtain the first authorization information (C-testdata),
aborting the procedure if process to obtain first authorization information (C-testdata) detected an error.

Subsequently, the enrollee processor may be arranged for, in a next message,
generating second authorization information (E-testdata),
encrypting second authorization information (E-testdata) with second shared key (k2) to form encrypted second authorization information ({E-testdata}),
sending encrypted second authorization information ({E-testdata}) to the configurator (230) over wireless communication.

Subsequently, the enrollee processor may be arranged for, in the same or in a further message,
sending encrypted required configuration information ({E-attributes}) to the configurator (230) over wireless communication.

Subsequently, the enrollee processor may be arranged for, in a next message,
receiving over wireless communication first signed network access information (SecurityData) from configurator (230),
aborting the procedure if first signed network access information (SecurityData) is not correctly signed.

Finally, the enrollee processor may be arranged for, in a further message,
receiving second signed network access information (SecurityData2) from a second enrollee (120)

setting up secure communication with second enrollee (120) using first signed network access information (SecurityData) and second signed network access information (SecurityData2) and possibly also its private network access encryption information (ENpr).

In the exemplary embodiment of the network system the configurator (230) comprises a configurator processor (131). The configurator (230) further has configurator public encryption information (CI) and associated configurator private encryption information (CIpr). The configurator may have output means using a technology other than the wireless communication for outputting or displaying configurator public encryption information (CI), such as a display. The configurator processor is arranged for receiving the enrollee public temporary encryption information (EE) with the encrypted enrollee public network access encryption information ({EN}) from enrollee (210) over wireless communication, computing a first shared key (k1) using at least the configurator private encryption information (CIpr) and the enrollee public temporary encryption information (EE), decrypting the encrypted enrollee public network access encryption information ({EN}) with the first shared key (k1) to obtain the enrollee public network access encryption information (EN), aborting the procedure if process to obtain the enrollee public network access encryption information (EN) detected an error, generating first authorization information (C-testdata), computing second shared key (k2) using at least the configurator private encryption information (CIpr), the enrollee public temporary encryption information (EE) and the enrollee public network access encryption information (EN), encrypting the first authorization information (C-testdata) to form the encrypted first authorization information ({C-testdata}), sending over wireless communication encrypted first authorization information ({C-testdata}) to enrollee (210).

Subsequently, the configurator processor may be arranged for, in a further message, receiving encrypted second authorization information ({E-testdata}) from enrollee (210) over wireless communication, decrypting encrypted second authorization information ({E-testdata}) with second shared key (k2) to obtain second authorization information (E-testdata), aborting the procedure if process to obtain second authorization information (E-testdata) detected an error.

Subsequently, the configurator processor may be arranged for, in a further message, digitally signing enrollee public network access encryption information (EN), using digitally signed enrollee public network access encryption information (EN) to form first signed network access information (SecurityData), sending over wireless communication first signed network access information (SecurityData) to enrollee (210).

It is noted that various nonces (C-nonce, E-nonce) may be generated and added to the messages and/or encrypted parts of such messages to make the messages unique.

Figure 4:
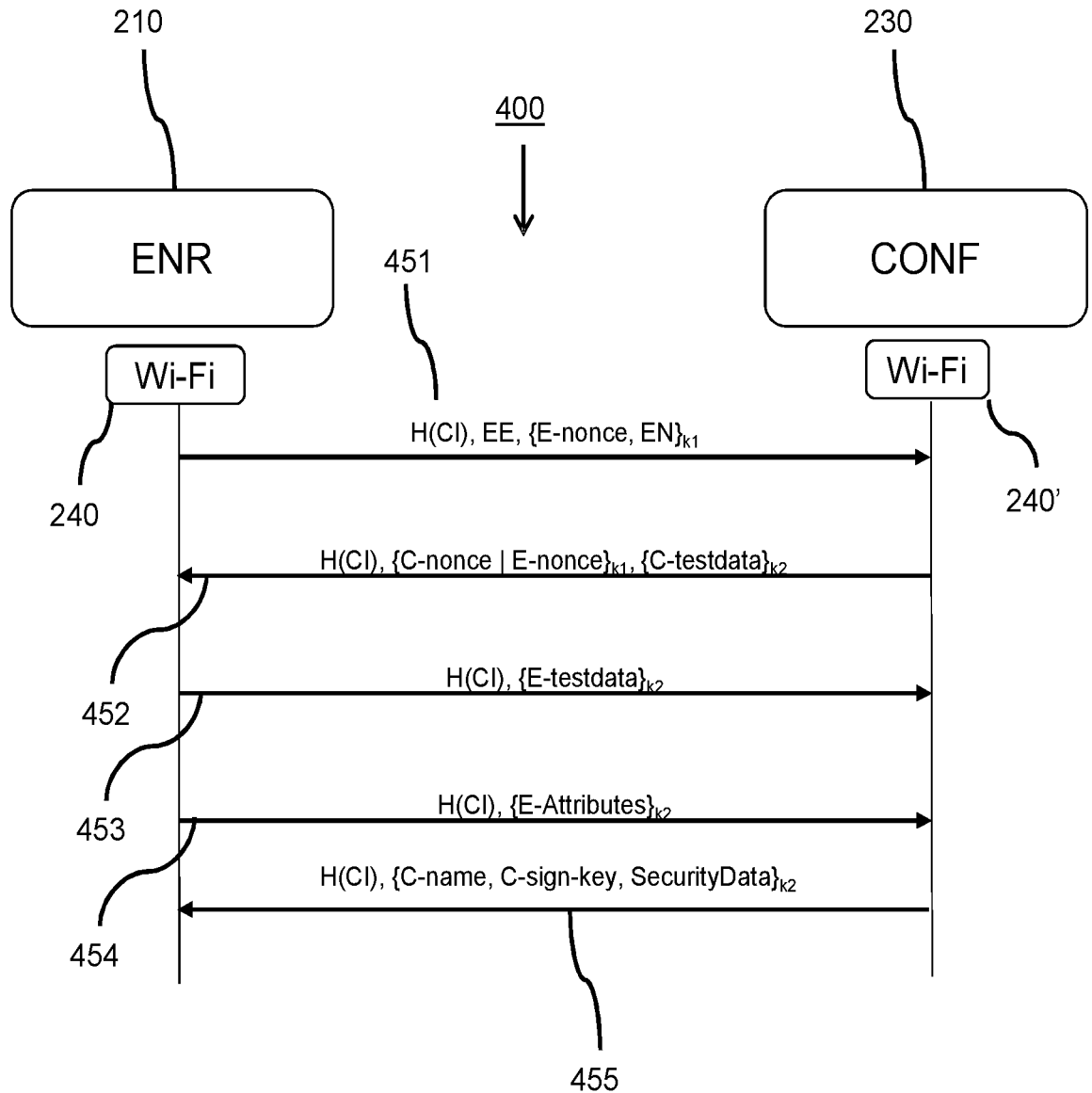
FIG. 4 shows a third example of a network system and security protocol.

FIG. 4 shows a third example of a network system and security protocol.

Aspects of the protocol that correspond to the system described above with reference to FIG. 3 are not repeated here. In the example, the security protocol 400 provides authentication using five messages. The protocol provides authentication and network access provisioning parts in separated messages compared to the above protocols.

The first message is a network access request 451, which contains the following elements: H(CI), EE, {E-nonce, EN}$_{k1}$ The second message is an authentication response 452 and contains the following elements: H(CI), {C-nonce|E-nonce}$_{k1}$, {C-testdata}$_{k2}$ The third message is an authentication confirm 453 and contains the following elements: H(CI), {E-testdata}$_{k2}$ The fourth message is a network access information 454 and contains the following elements: H(CI), {E-Attributes}$_{k2}$ The fifth message is a network access response 455 and contains the following elements: H(CI), {[C-name,] [C-sign-key,] SecurityData}$_{k2}$ The first three messages provide authentication, where the fourth and fifth message provide network access provisioning.

Figure 5:
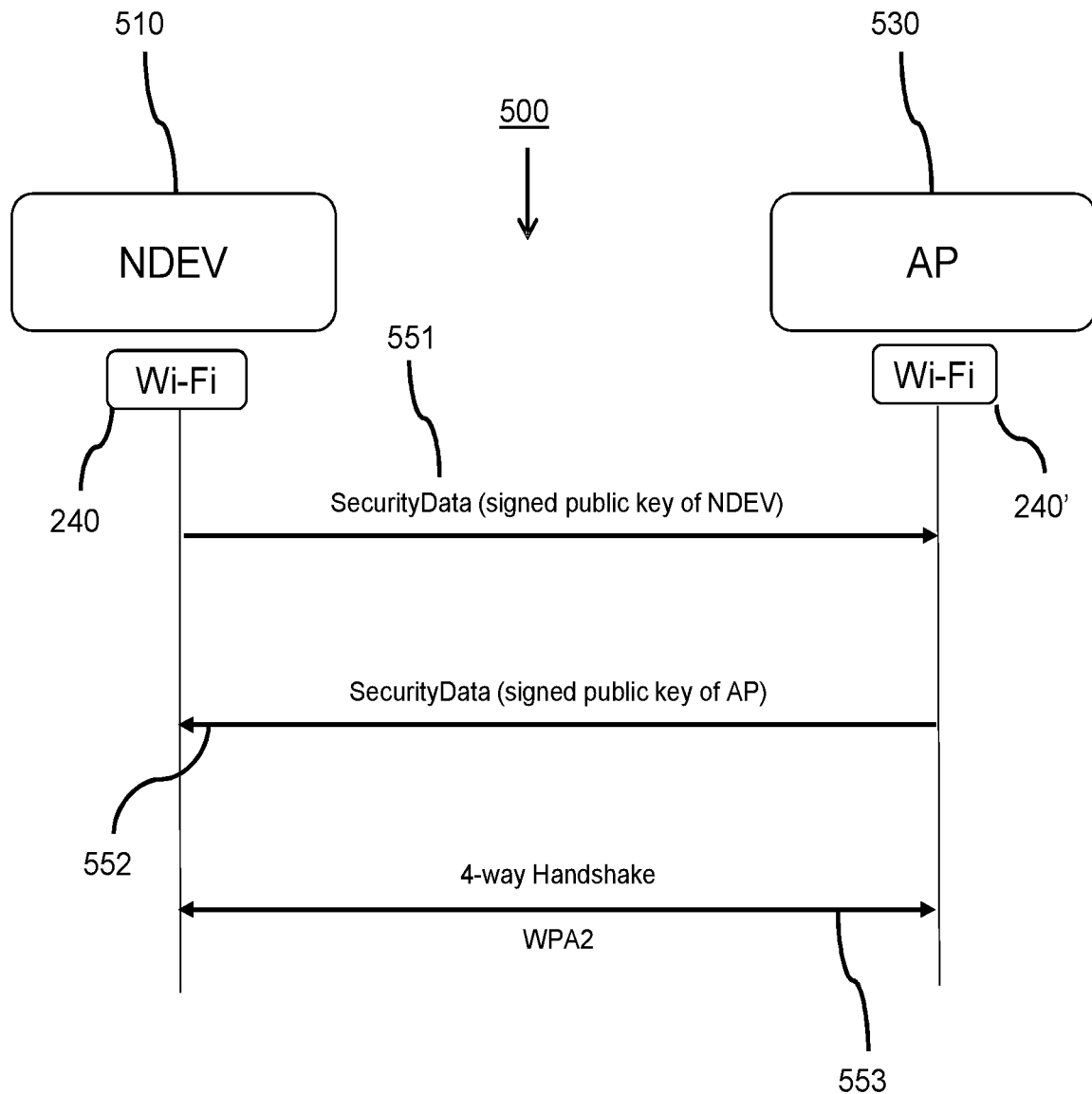
FIG. 5 shows a fourth example of a network system and security protocol.

FIG. 5 shows a fourth example of a network system and security protocol.

Aspects of the protocol that correspond to the system described above with reference to FIG. 2 are not repeated here. A network device NDEV 510 communicates with an access point AP 530. In the example, the security protocol 500 provides network access based on public keys. The protocol exchanges signed public keys contained in SecurityData, and continues to derive a Pairwise Master Key (PMK), for example the shared secret key used in the IEEE 802.11i-2004 protocol, for 4-way handshake using Diffie-Hellman.

The first message 551 contains the following elements: SecurityData containing signed public key of the Network Device.

The second message 552 contains the following elements: SecurityData containing signed public key of the Access Point.

A further message sequence 553 provides the following: 4-way Handshake and WPA2 secured Wi-Fi communication. Wi-Fi Protected Access (WPA) and Wi-Fi Protected Access II (WPA2) are two security protocols and security certification programs developed by the Wi-Fi Alliance to secure wireless computer networks. The Alliance defined these in response to serious weaknesses researchers had found in the previous system, Wired Equivalent Privacy (WEP). WPA (sometimes referred to as the draft IEEE 802.11i standard) became available in 2003. The Wi-Fi Alliance intended it as an intermediate measure in anticipation of the availability of the more secure and complex WPA2. WPA2 became available in 2004 and is a common shorthand for the full IEEE 802.11i (or IEEE 802.11i-2004) standard; IEEE 802.11 (2012) has incorporated IEEE 802.11i.

Figure 6:
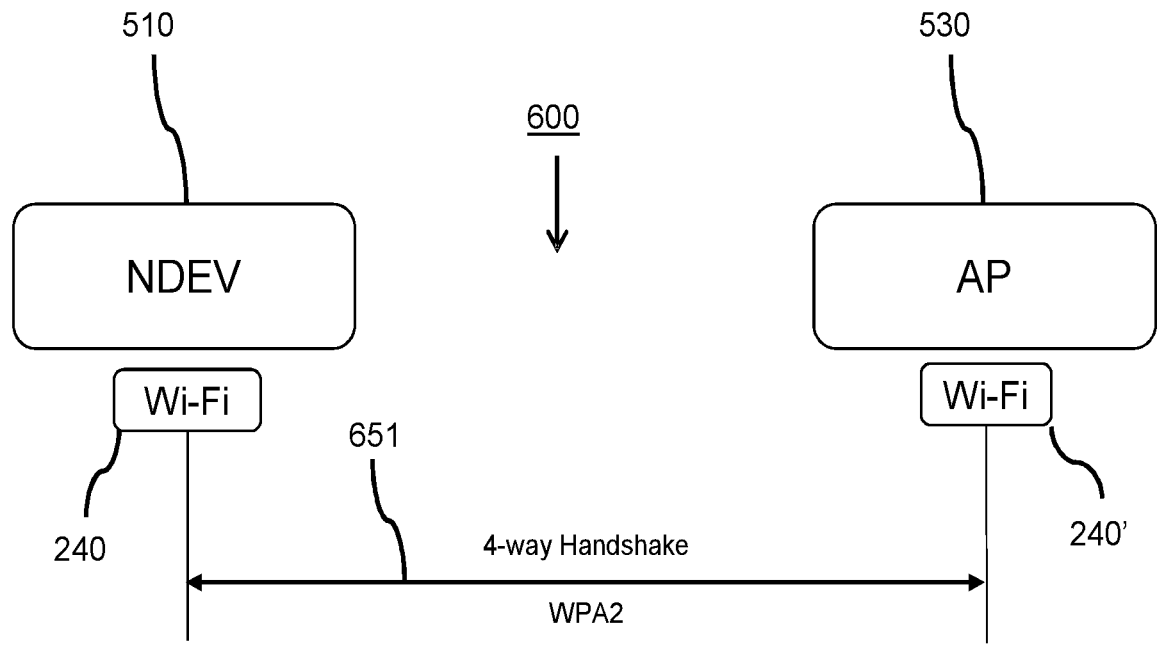
FIG. 6 shows a fifth example of a network system and security protocol.

FIG. 6 shows a fifth example of a network system and security protocol. Aspects of the protocol that correspond to the system described above with reference to FIG. 5 are not repeated here. In the example, the security protocol 600 provides network access based on Wi-Fi passphrase. The protocol derives the PMK for 4-way handshake from Wi-Fi passphrase in SecurityData.

A message sequence 651 provides the following: 4-way Handshake and WPA2 secured Wi-Fi communication.

Figure 7:
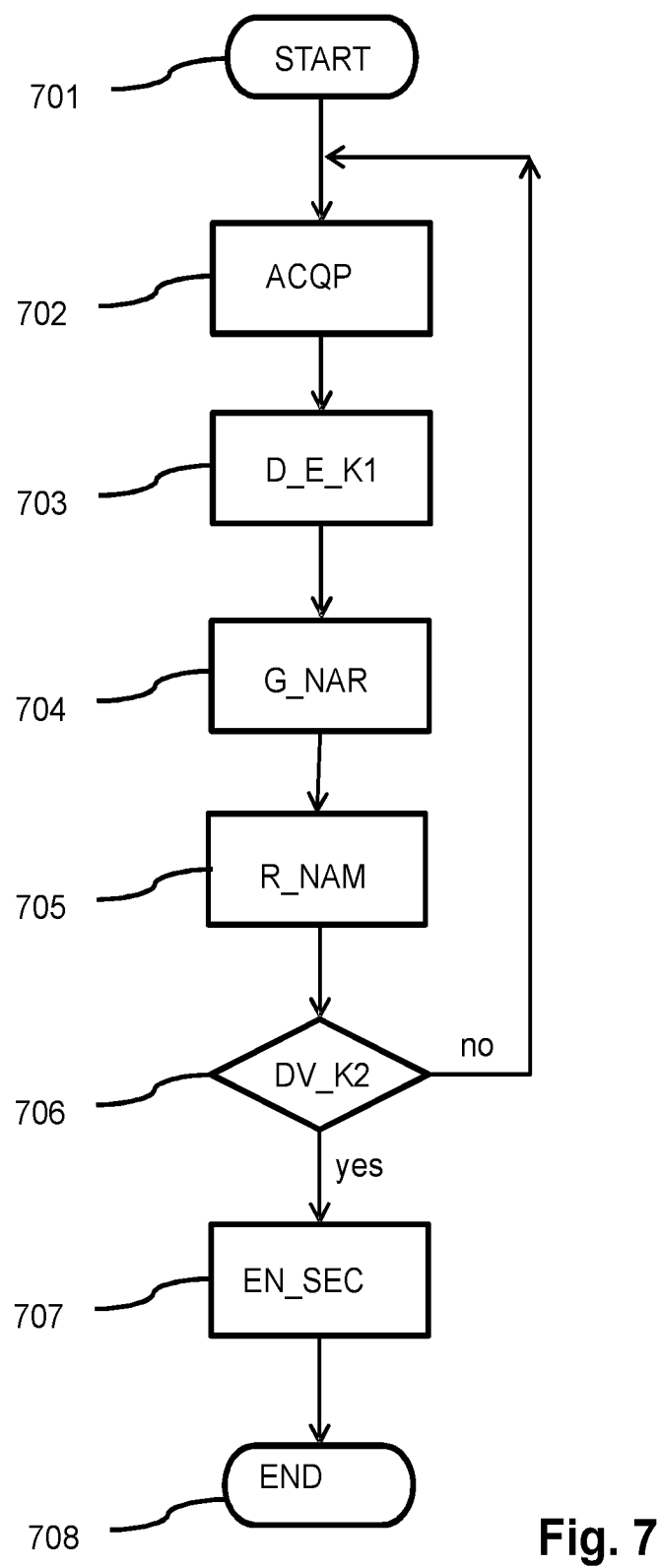
FIG. 7 shows an example of an enrollee method.

FIG. 7 shows an example of an enrollee method. The method is for use in a network device acting as enrollee in the network system as described above. The method starts at node START 701 and includes as a first stage ACQP 702 acquiring a data pattern via an out-of-band channel by an enrollee sensor. The data pattern is provided in the area and represents the network public key. In a next stage D_E_K1 703 a first shared key is derived based the network public key and the first enrollee private key, and the second enrollee public key is encoded using the first shared key. In a next stage G_NAR 704 a network access request is generated according to the security protocol. The network access request includes the encoded second enrollee public key and the first enrollee public key. The network access request is transferred to the configurator via the wireless communication. In a next stage R_NAM 705 the network access message is received from the configurator via the wireless communication. In a next stage DV_K2 706 the second shared key is derived based on the first enrollee private key, the second enrollee private key and the network public key. Also it is verified whether at least one of the protected security data and the protected configurator public key was cryptographically protected by the second shared key. If the protection is not correct the method returns to the start 701. If correct, in a next stage EN_SEC 707 the secure communication is engaged based on the second enrollee private key and the security data. The method stops at node END 708.

Figure 8:
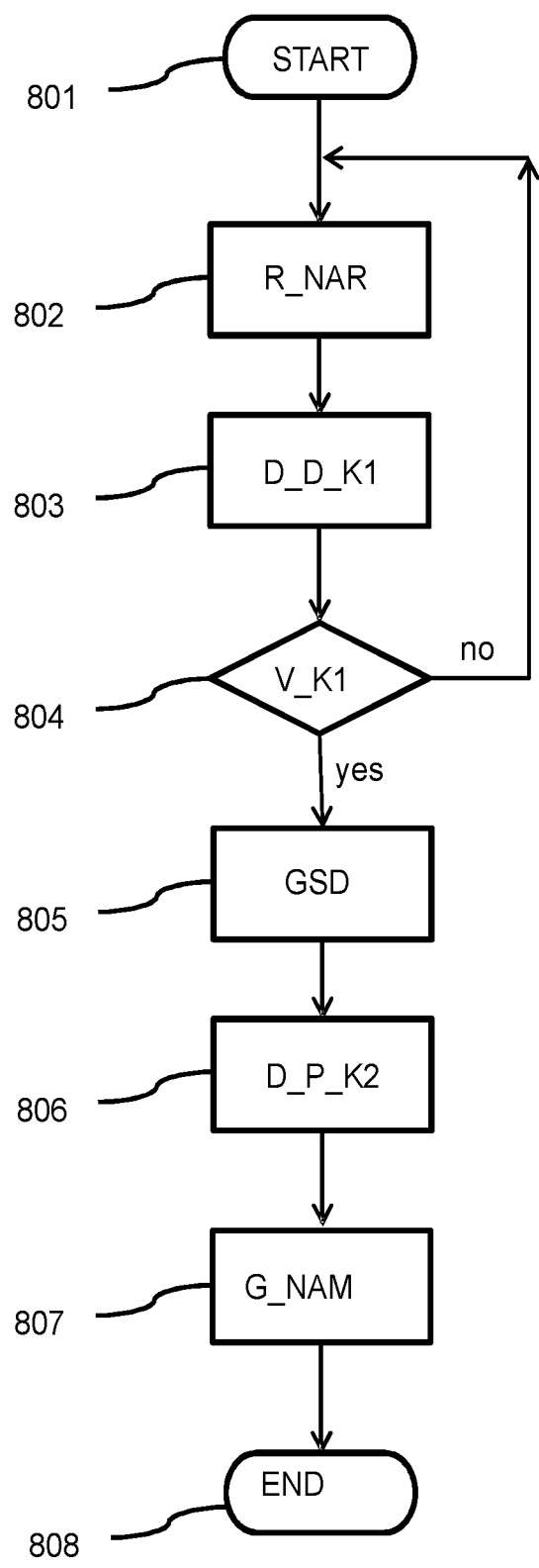
FIG. 8 shows an example of a configurator method

FIG. 8 shows an example of a configurator method. The method is for use in a network device acting as configurator in the network system as described above. The method starts at node START 801 and includes as a first stage R_NAR 802 receiving the network access request from the enrollee via the wireless communication. In a next stage D_D_K1 803 the first shared key is derived based on the network private key and the first enrollee public key. Also the encoded second enrollee public key is decoded using the first shared key. In a next stage V_K1 804 it is verified whether the encoded second enrollee public key was encoded by the first shared key. If the protection is not correct the method returns to the start 801. If correct, in a next stage GSD 805 security data is generated using the second enrollee public key and the configurator private key. In a next stage D_P_K2 806 a second shared key is derived based on the first enrollee public key, the second enrollee public key and the network private key. Also at least one of the security data and configurator public key are cryptographically protected using the second shared key. Then in next stage G NAM 807 the network access message is generated according to the security protocol. The network access message includes at least one of the protected security data and protected configurator public key. The method stops at node END 808.

Computer program products, downloadable from a network and/or stored on a computer-readable medium and/or microprocessor-executable medium, are provided that comprise program code instructions for implementing the above methods when executed on a computer for protecting location information, as elucidated further below.

Typically, each network comprises a processor which executes appropriate software stored at the devices; for example, that software may have been downloaded and/or stored in a corresponding memory, e.g., a volatile memory such as RAM or a non-volatile memory such as Flash (not shown). The mobile device and servers may for example be equipped with microprocessors and memories (not shown). Alternatively, the enrollee and configurator may, in whole or in part, be implemented in programmable logic, e.g., as field-programmable gate array (FPGA). The mobile device and servers may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc. In practice, the location engine may be implemented via a library of software subroutines that is linked to an operating system of a mobile device.

Many different ways of executing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 9A:
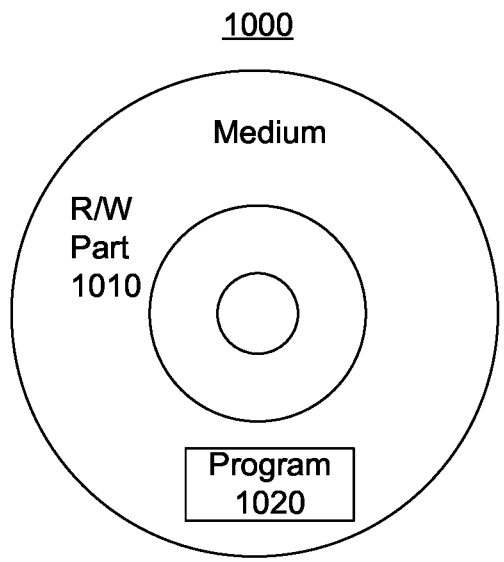
FIG. 9a shows a computer readable medium.

FIG. 9a shows a computer readable medium 1000 having a writable part 1010 comprising a computer program 1020, the computer program 1020 comprising instructions for causing a processor system to perform one or more methods in the system for protecting location information, according to an embodiment of the provider server method, the location server method, the location engine method or the location based application method as described with reference to FIG. 2-8. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 9B:
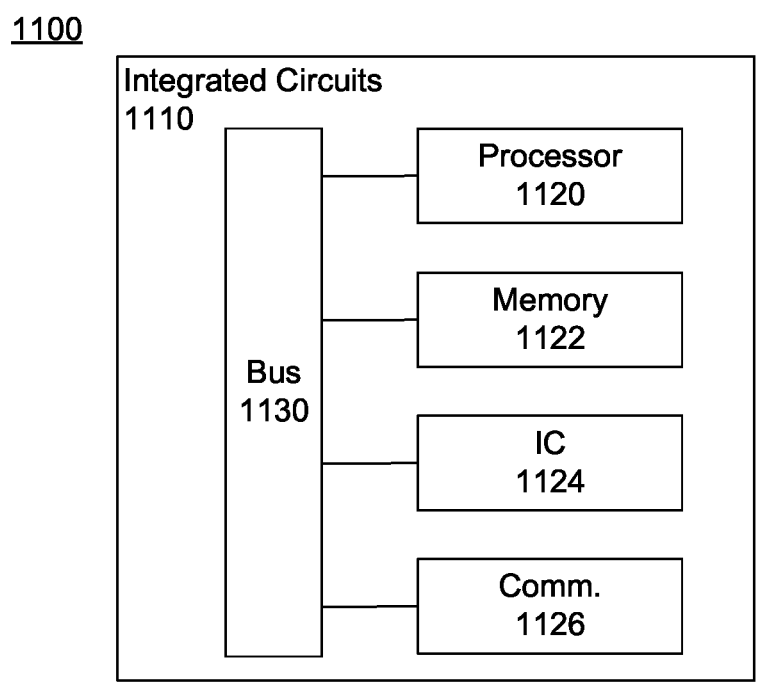
FIG. 9b shows in a schematic representation of a processor system.

FIG. 9b shows in a schematic representation of a processor system 1100 according to an embodiment of the provider server, the location server or the mobile device. The processor system comprises one or more integrated circuits 1110. The architecture of the one or more integrated circuits 1110 is schematically shown in the Figure. Circuit 1110 comprises a processing unit 1120, e.g., a CPU, for running computer program components to execute a method according to an embodiment and/or implement its modules or units.

Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It will be appreciated that, for clarity, the above description has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. An enrollee device comprising:
   an enrollee wireless communication unit,
   an enrollee sensor that acquires a data pattern, the data pattern representing a network public key; and
   an enrollee processor comprising a memory that includes a first enrollee public key and a corresponding first enrollee private key and includes a second enrollee public key and a corresponding second enrollee private key,
   wherein the enrollee processor:
      derives a first shared key based on the network public key and the first enrollee private key,
      encodes the second enrollee public key using the first shared key,
      generates a network access request, the network access request including the encoded second enrollee public key and the first enrollee public key,
      transfers the network access request to a configurator device;
      receives a network access message from the configurator device, wherein the network access message includes protected data that is encrypted at the configurator device using a second shared key,
      derives the second shared key based on the first enrollee private key, the second enrollee private key, and the network public key,
      verifies that the protected data was cryptographically protected by the second shared key, and
      engages the secure communication based on the second enrollee private key and the protected data.

2. The enrollee device as claimed in claim 1, wherein the enrollee processor generates at least one of:
   a first set of keys comprising the first enrollee public key and the first enrollee private key;
   a second set of keys comprising the second enrollee public key and the second enrollee private key.

3. The enrollee device as claimed in claim 1, wherein the protected data comprises a configurator session key, and
   wherein the enrollee processor engages the secure communication based on the configurator session key.

4. The enrollee device as claimed in claim 1, wherein the enrollee processor:
   derives a third shared key based on the second enrollee private key and a configurator session public key provided by the configurator device, and
   engages secure communication based on the third shared key.

5. The enrollee device as claimed in claim 1, wherein the enrollee processor:
   derives a third shared key based on the second enrollee private key and a session network public key provided by a further network device, and
   engages secure communication with the further network device based on the third shared key.

6. The enrollee device as claimed in claim 1, wherein the protected data includes a digital signature of the second enrollee public key using a configurator private key of the configurator device,
   wherein the enrollee processor:
      verifies, based on the digital signature and a configurator public key of the configurator device, whether the second enrollee public key was correctly signed and,
      if the second enrollee public key was correctly signed, engages the secure communication based on the second enrollee private key.

7. The enrollee device as claimed in claim 1, wherein the enrollee processor:
   receives a further public key and a further digital signature of the further public using a configurator private key of the configurator device,
   verifies, based on the further digital signature and the configurator public key, whether the further public key was correctly signed and,
   if the further public key was correctly signed, securely communicates with a further network device using the second enrollee private key and the further public key.

8. The enrollee device as claimed in claim 1, wherein the enrollee processor:
   generates enrollee test data,
   encodes the enrollee test data using the second shared key, and
   transfers the encoded enrollee test data to the configurator device for verification by the configurator device.

9. The enrollee device as claimed in claim 1, wherein the enrollee processor:
   receives encoded configurator test data from the configurator device;
   decodes the encoded configurator test data using the second shared key, and verifies whether the configurator test data was encoded by the second shared key at the configurator.

10. An enrollee method comprising:
acquiring a data pattern, the data pattern representing a network public key;
accessing a memory that includes the first enrollee public key and a corresponding first enrollee private key, and includes the second enrollee public key and a corresponding second enrollee private key,
deriving a first shared key based on the network public key and the first enrollee private key,
encoding the second enrollee public key using the first shared key,
generating a network access request, the network access request including the encoded second enrollee public key and the first enrollee public key,
transferring the network access request to a configurator device;
receiving a network access message from the configurator, the network access message comprising protected data;
deriving a second shared key based on the first enrollee private key, the second enrollee private key, and the network public key,
verifying that the protected data was cryptographically protected by the second shared key, and
engaging the secure communication based on the second enrollee private key and the protected data.

11. The enrollee method as claimed in claim 10, comprising generating at least one of:
a first set of keys comprising the first enrollee public key and the corresponding first enrollee private key; and
a second set of keys comprising the second enrollee public key and the corresponding second enrollee private key.

12. The enrollee method as claimed in claim 10, wherein the protected data includes a configurator session key;
wherein the enrollee method comprises engaging the secure communication based on the configurator session key.

13. The enrollee method as claimed in claim 10, the enrollee method comprises:
receiving a configurator session public key from the configurator device,
deriving a third shared key based on the second enrollee private key and the configurator session public key and engaging secure communication based on the third shared key.

14. The enrollee method as claimed in claim 10, wherein the enrollee method comprises:
receiving a session network public key from a further network device,
deriving a third shared key based on the second enrollee private key and the session network public key, and
securely engaging communication with the further network device based on the third shared key.

15. The enrollee method as claimed in claim 10, wherein the protected data includes a digital signature of the second enrollee public key using a configurator private key of the configurator device, and
wherein the enrollee method comprises: verifying, based on the digital signature and a configurator public key of the configurator device, whether the second enrollee public key was correctly signed and, if the second enrollee public key was correctly signed, engaging the secure communication with a further device based on the second enrollee private key.

16. The enrollee method as claimed in claim 10, wherein the enrollee method comprises: receiving a further public key and a further digital signature of the further public key of a further network device using the configurator private key of the configurator device, verifying, based on the further digital signature and the configurator public key, whether the further public key was correctly signed, and if the further public key was correctly signed, securely communicating with the further network device using the second enrollee private key and the further public key.

17. The enrollee method as claimed in claim 10, wherein the enrollee method comprises:
generating enrollee test data,
encoding the enrollee test data using the second shared key, and
transferring the encoded enrollee test data to the configurator device.

18. The enrollee method as claimed in claim 10, wherein the enrollee method comprises:
decoding encoded configurator test data using the second shared key, and
verifying whether the configurator test data was encoded by the second shared key at the configurator device.

* * * * *